United States Patent Office.

SOLOMON KEPNER, OF POTTSTOWN, PENNSYLVANIA.

Letters Patent No. 108,030, dated October 4, 1870.

IMPROVEMENT IN COMPOSITIONS FOR DESTROYING WORMS IN FRUIT-TREES.

The Schedule referred to in these Letters Patent and making part of the same.

*To all whom it may concern:*

Be it known that I, SOLOMON KEPNER, of Pottstown, in the county of Montgomery and in the State of Pennsylvania, have invented a certain new and useful Composition for Destroying Worms in Fruit-Trees; and do hereby declare that the following is a full, clear, and exact description thereof.

The object of my invention is to effectually destroy worms that imbed themselves in the bark of peach and other fruit-trees, and not only injure the fruit, but also eventually destroy the tree; and It consists in the hereinafter-described composition, compounded of the ingredients and in the manner substantially as and for the purpose shown.

To form the desired compound, I dissolve one ounce of asafetida in one pint of coal-oil, and then add one-half gill of fish-oil.

The compound is applied to the bark of the tree with a brush or sponge, and, by means of the penetrating nature of the coal-oil, is caused to pass through the same into the wood, where the asafetida and fish-oil remain, while said coal evaporates.

Within five minutes after the application of the composition the worms make their appearance upon the surface of the bark, and, falling to the ground, die.

The odors of the asafetida and fish-oil are of such a character that no insect can endure them, and, being very durable, one application of the composition each year will be sufficient to entirely prevent worms from troubling trees.

Having thus fully set forth the nature and merits of my invention,

What I claim as new is—

The hereinbefore-described composition, substantially as and for the purpose specified.

In testimony that I claim the foregoing, I have hereunto set my hand this 21st day of September, 1870.

SOLOMON KEPNER.

Witnesses:
L. H. DAVIS,
WM. M. EVANS.